(12) United States Patent
Jindai

(10) Patent No.: US 9,522,428 B2
(45) Date of Patent: Dec. 20, 2016

(54) SMALL-DIAMETER DRILL

(71) Applicant: SUMITOMO ELECTRIC HARDMETAL CORP., Itami-shi, Hyogo (JP)

(72) Inventor: Masaaki Jindai, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 125 days.

(21) Appl. No.: 14/434,904

(22) PCT Filed: Oct. 24, 2013

(86) PCT No.: PCT/JP2013/078804
§ 371 (c)(1),
(2) Date: Apr. 10, 2015

(87) PCT Pub. No.: WO2014/065361
PCT Pub. Date: May 1, 2014

(65) Prior Publication Data
US 2015/0283624 A1 Oct. 8, 2015

(30) Foreign Application Priority Data
Oct. 25, 2012 (JP) .................. 2012-235463

(51) Int. Cl.
*B23B 51/02* (2006.01)
*B23B 51/06* (2006.01)

(52) U.S. Cl.
CPC .............. *B23B 51/02* (2013.01); *B23B 51/06* (2013.01); *B23B 2251/14* (2013.01);
(Continued)

(58) Field of Classification Search
CPC . B23B 51/02; B23B 2251/082; B23B 2251/14
See application file for complete search history.

(56) References Cited

U.S. PATENT DOCUMENTS 4,583,888 A 4/1986 Mori et al.
4,602,900 A 7/1986 Arpaio, Jr. et al.
(Continued)

FOREIGN PATENT DOCUMENTS

CN 202062106 U 12/2011
CN 102389991 A 3/2012
(Continued)

OTHER PUBLICATIONS

Machine translation of JP 2007-229899, printed Sep. 2016.*
(Continued)

*Primary Examiner* — Daniel Howell
(74) *Attorney, Agent, or Firm* — Venable LLP; Michael A. Sartori

(57) ABSTRACT

A small-diameter drill having a diameter of φ3 mm or less and an end that has undergone cross thinning is provided such that in a front view, a flute portion cutting edge is curved in concave with a degree of concavity with respect to an imaginary straight line in a range of 0.5 to 2% of a drill diameter, the imaginary straight line connecting the radially outer end of the flute portion cutting edge and the radially outer end of thinning portion cutting edge, the ratio of length of the thinning portion cutting edge to length of the flute portion cutting edge is set to 0.6 to 0.9:1, and in an axially perpendicular cross-sectional view, curvature radius of a heel-side flute surface of the flute is set to be smaller than curvature radius of a flute surface along the flute portion cutting edge.

4 Claims, 3 Drawing Sheets

(52) U.S. Cl.
    CPC ..... *B23B 2251/18* (2013.01); *B23B 2251/408* (2013.01); *B23B 2251/426* (2013.01); *Y10T 408/9097* (2015.01)

(56) References Cited

U.S. PATENT DOCUMENTS

| | | | |
|---|---|---|---|
| 5,888,036 A | 3/1999 | Arai et al. | |
| 8,545,141 B2 * | 10/2013 | Jindai | ............. B23B 51/02 408/230 |
| 2016/0144436 A1 * | 5/2016 | Kuroda | ............. B23B 51/02 408/230 |

FOREIGN PATENT DOCUMENTS

| | | |
|---|---|---|
| CN | 102458740 A | 5/2012 |
| CN | 202239818 U | 5/2012 |
| JP | S57-107716 A | 7/1982 |
| JP | S60-120712 U | 8/1985 |
| JP | S60-120713 U | 8/1985 |
| JP | 2001-225216 A | 8/2001 |
| JP | 2004025383 A * | 1/2004 |
| JP | 2007-229900 A | 9/2007 |
| JP | 2007229899 A * | 9/2007 |
| JP | 2008296300 A * | 12/2008 |
| JP | 2009018360 A * | 1/2009 |
| JP | 2010274409 A * | 12/2010 |
| JP | 2012030306 A * | 2/2012 |
| JP | WO 2012070640 A1 * | 5/2012 ............. B23B 51/02 |
| KR | 2010-0029821 A | 3/2010 |

OTHER PUBLICATIONS

Machine translation of JP 2010-274409, printed Sep. 2016.*
Extended European Search Report in European Patent Application No. 13848502.4, dated Sep. 14, 2015.
Nov. 19, 2013 International Search Report issued in PCT/JP2013/078804.
Notification of the First Office Action in Chinese Patent Application No. 201380055624.7, dated Mar. 3, 2016.

* cited by examiner

SMALL-DIAMETER DRILL

TECHNICAL FIELD

The present invention relates to a drill (which is referred to as a small-diameter drill in the present invention) that has a diameter of 3 mm or less and is designed to achieve an improved machining performance while assuring the strength of a cutting edge,

BACKGROUND ART

The small-diameter drill in the title tends to have an increased core thickness in order to ensure the strength. For a drill having an increased core thickness, a method of reducing thrust force is adopted, by which cross thinning (also referred to as X thinning) is applied to the drill.

For a drill having an increased core thickness, cutting amount of a cutting edge is increased, and when the cutting edge of a flute (helical flute) portion is a straight line cutting edge, the radial rake angle (radial rake angle of the outer circumferential cutting edge) has a large negative angle, and thus an approach is adopted in which the flute portion cutting edge is curved in concave against a rotational direction of the drill so as to achieve a positive radial rake angle.

As a conventional example of a small-diameter drill having such a design, there is one disclosed in, for example, PTL 1 listed below,

CITATION LIST

Patent Literature

PTL 1: Japanese Unexamined Patent Application Publication No. 2001-225216

SUMMARY OF INVENTION

Technical Problem

A drill having an increased core thickness has a flute with a shallow flute depth and a small flute area, and thus chip processing is difficult, In addition, a small-diameter drill has a low feed rate at the time of machining for rigidity reasons (the recommended condition of a feed for a conventional drill is 1% of the drill diameter), and thus processing of chip becomes more and more difficult.

In the drill of PTL 1 mentioned above, almost the entire area of the flute surface of the flute has an approximately constant curvature radius, and thus when a workpiece is something like stainless steel which has a high toughness, segmentation processing of chip is difficult and stable chip processing performance is hardly expected.

Also, a drill with the flute portion cutting edge curved in concave has reduced strength of the outer circumferential portion of the cutting edge and so the strength tends to be insufficient.

Reduction in the strength of the outer circumferential portion of the cutting edge due to the curved in concave flute portion cutting edge can be recovered to some extent by performing return machining to set the radial rake angle to be, for example, 0°. However, it is not preferable that return machining be performed on a small-diameter drill because the return machining reduces the amount of back metal that affects to the strength.

The problem to be solved by the present invention is how to restrain reduction in the strength of the outer circumferential portion of the cutting edge without providing a return portion while assuring sharpness of the outer circumferential portion of the cutting edge without an insufficiency, as well as how to achieve favorable machining accuracy and favorable chip processing performance.

Solution to Problem

In order to solve the above-described problem, the present invention has implemented a small-diameter drill having a diameter of φ3 mm or less and the end that has undergone cross thinning in the following manner. That is, in a front view, a flute portion cutting edge is curved to be concave against a rotational direction with respect to an imaginary straight line that connects a radially outer end of the flute portion cutting edge and a radially outer end of a thinning portion cutting edge, a degree of concavity d of the flute portion cutting edge with respect to the imaginary straight line is set in a range of 0.5 to 2% of a drill diameter D, furthermore, a ratio B : A of a length B of the thinning portion cutting edge to a length A of the flute portion cutting edge is set to 0.6 to 0.9:1, and in an axially perpendicular cross-sectional view, a curvature radius R1 of a heel-side flute surface of the flute is set to be smaller than a curvature radius R2 of a flute surface along the flute portion cutting edge, In such a small-diameter drill, when the radial rake angle $\gamma$ of the radially outer end of the flute portion cutting edge is too small, sharpness of the outer circumferential portion of the cutting edge decreases, on the other hand when the radial rake angle $\gamma$ is too large, sharpness of the outer circumferential portion of the cutting edge tends to be insufficient, and thus the radial rake angle $\gamma$ is preferably set to −5 to −15°.

Also it is preferable that the core thickness of the body be set to 0.30 D to 0.37 D and the flute width ratio $\theta1:\theta2$ be set to 0.70 to 0.90: 1.

In addition, it is preferable that the cutting edge be an edge that has undergone reinforcing treatment of round honing with R radius of 0.005 to 0.015 mm.

Advantageous Effects of Invention

Since the flute portion cutting edge is curved in concave, the small-diameter drill of the present invention causes blunting of the radial rake angle to be restrained, and sharpness of the outer circumferential portion of the cutting edge can be increased without performing on the outer circumferential portion return machining which causes the amount of back metal to be reduced.

In addition, by setting the degree of concavity d of the flute portion cutting edge in a range of 0.5 to 2% of the drill diameter D, reduction in the strength of the outer circumferential portion of the cutting edge is restrained.

Furthermore, by setting the ratio of the length of the thinning portion cutting edge to the length of the flute portion cutting edge to 0.6 to 0.9:1, the balance between the cutting edges is maintained and accuracy in machining a hole is improved.

Also, by setting the curvature radius of the heel-side flute surface of the flute to be smaller than the curvature radius of the flute surface along the flute portion cutting edge in an axially perpendicular cross-sectional view, the chip processing performance is also improved.

That is, the chips generated by hole machining are usually curled and processed by the flow of chips generated by the flute portion cutting edge. However, with a small-diameter drill having a greater core thickness compared with a typical drill, chips (which have a greater thickness than the chips generated by the flute portion cutting edge) cut by the thinning portion cutting edge have a larger volume, and thus those chips generated by the flute portion cutting edge have less effect and the chips are not curled but tend to be extended, and so favorable evacuation is difficult to be achieved in deep hole machining.

To cope with this problem, with the drill of the present invention, the chips generated by the flute portion cutting edge reach the heel side while the chips still have a relatively higher outflow energy. Therefore, those chips are guided to the heel-side flute surface having a small curvature radius to receive a large curl force, and due to its effect, the chips cut by the thinning portion cutting edge also flow along the flute without resistance, thereby achieving smooth evacuation of chips and delivering stable performance even in deep hole machining.

DESCRIPTION OF EMBODIMENTS

Figure 1:
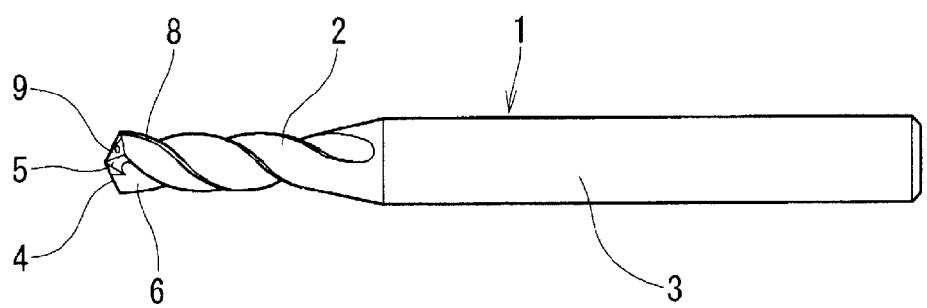
FIG. 1 is a side view illustrating an example of a drill of the present invention.
Figure 2:
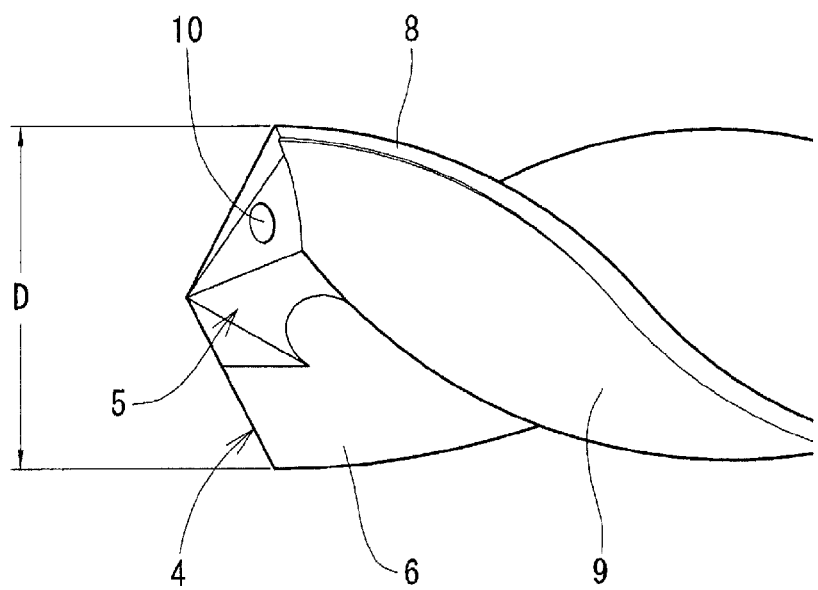
FIG. 2 is an enlarged side view of the front end of the drill of FIG. 1.

Hereinafter, an embodiment of a small-diameter drill of the present invention will be described with reference to FIGS. 1 to 5 in the accompanying drawings.

A small-diameter drill 1 illustrated is a step type two-edge drill, and includes a body 2 having a diameter (=a machining diameter) D of 3 mm or less, and a shank 3 having a diameter larger than the diameter of the body.

The small-diameter drill 1 has a cutting edge 4, a cross thinning portion 5, and a chisel edge (not illustrated) at the front end. In addition, the small-diameter drill 1 has a flute (helical flute) 6 at the outer circumference of the body 1 Two pieces of the cutting edges 4, cross thinning portion 5, and flute 6 are disposed symmetrically around a rotation center.

The cutting edge 4 consists of a thinning portion cutting edge 4b, and a flute portion cutting edge 4a that is connected to the outer end of the thinning portion cutting edge.

Figure 3:
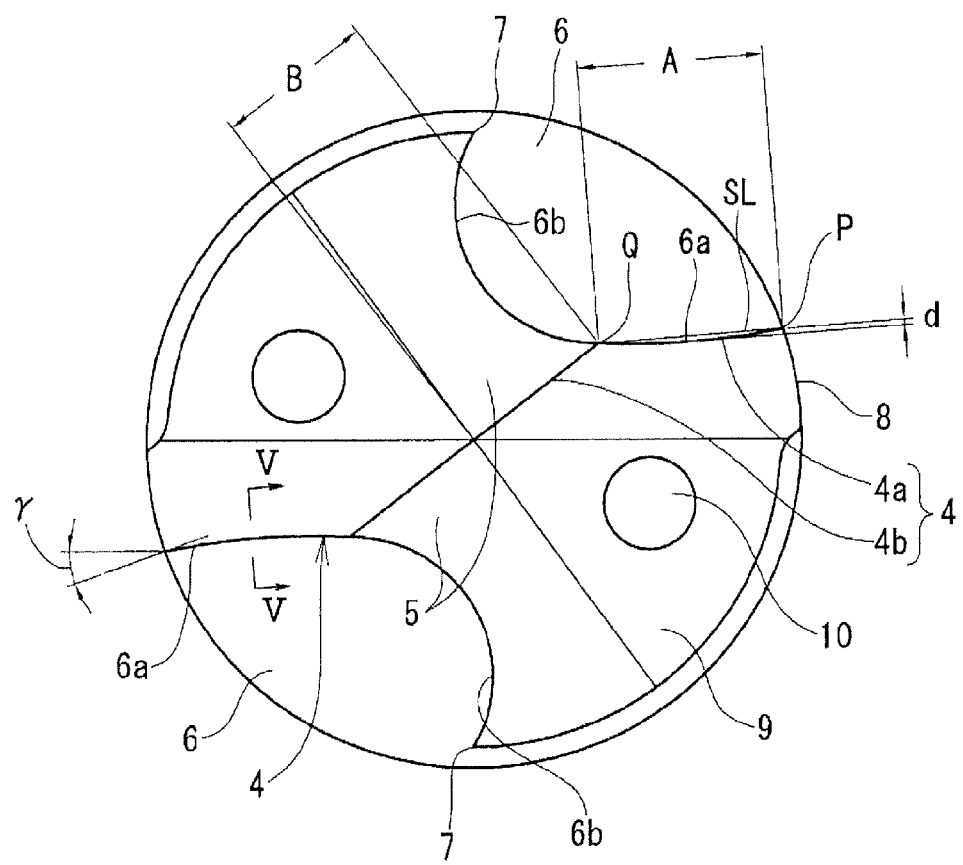
FIG. 3 is an enlarged front view of the drill of FIG. 1.
Figure 4:
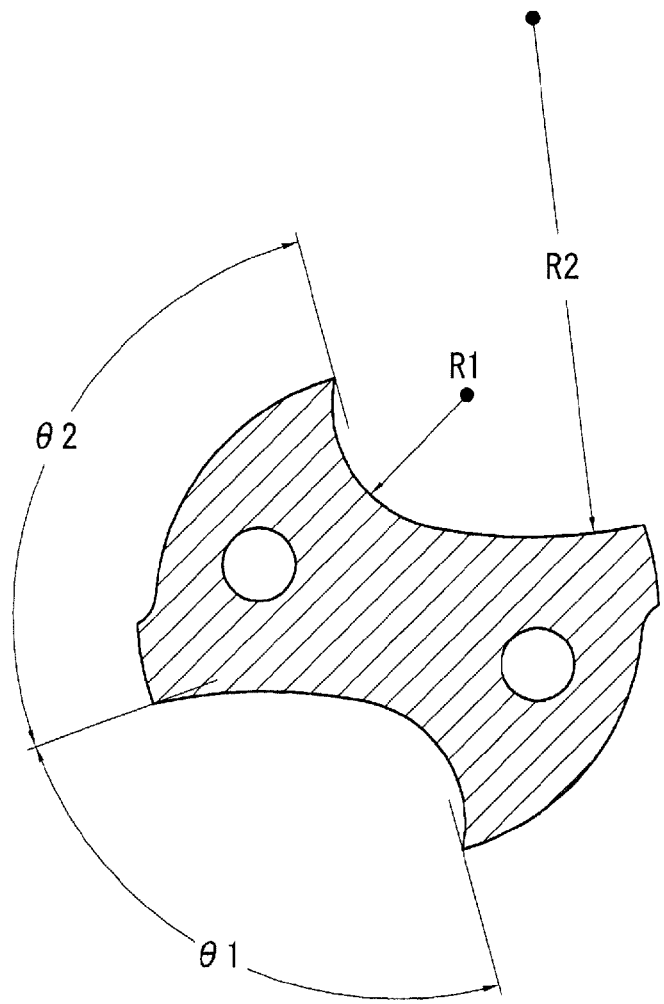
FIG. 4 is an axially perpendicular cross-sectional view of the flutes of the drill.

In the front view of FIG. 3, the flute portion cutting edge 4a is curved in concave (that is, the shape of the flute portion cutting edge is a slight arc) against a rotational direction with respect to an imaginary straight line SL that connects a radially outer end P of the flute portion cutting edge 4a and a radially outer end Q of the thinning portion cutting edge 4b, and the degree of concavity d of the flute portion cutting edge 4a with respect to the imaginary straight line SL is set in a range of 0.5 to 2% of the drill diameter D.

In addition, the ratio B:A of the length B of the thinning portion cutting edge 4b to the length A of the flute portion cutting edge 4a is set to 0.6 to 0.9:1. Furthermore, in the axially perpendicular cross-sectional view of FIG. 4, a curvature radius R1 of a flute surface 6b of the flute 6 on the heel 7 side illustrated in FIG. 3 is set to be smaller than a curvature radius R2 of a flute surface 6a along the flute portion cutting edge 4a.

The curvature radius R2 of the flute surface of the flute 6 along the flute portion cutting edge is set in a range of 70 to 140% of the drill diameter D, and the curvature radius R1 of the heel-side flute surface is set in a range of 20 to 40% of the drill diameter D.

In addition, in the drill illustrated, a radial rake angle γ (radial rake angle of the outer end of the flute portion cutting edge) is set to −7°.

In the drill of the present invention, it is preferable that the core thickness of the body 2 be set to 0.30D to 0.37D and the flute width ratio θ1:θ2 be set to 0.70 to 0.90:1. Setting the core thickness in the above-mentioned range enables the strength of the body to be assured without an insufficiency even with a drill used for high efficiency machining, and setting the flute width ratio θ1:θ2 in the above-mentioned range enables satisfactory evacuation performance to be achieved even in high efficiency machining. The high efficiency machining referred herein means machining in which a feed is increased to approximately 3% of the drill diameter D.

Figure 5:
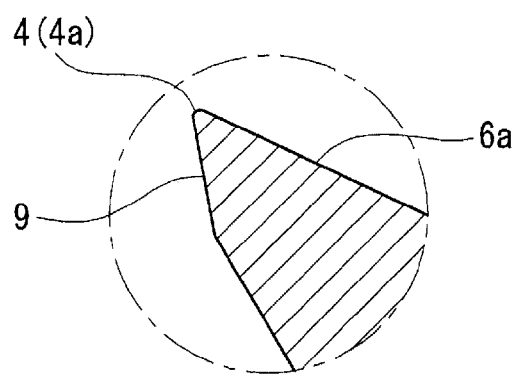
FIG. 5 is an enlarged cross-sectional view taken along line V-V of FIG. 3.

In addition, as illustrated in FIG. 5, it is preferable that the cutting edge 4 be an edge that has undergone reinforcing treatment of round honing. Although it is preferable that no reinforcing treatment be made on the cutting edge from the viewpoint of sharpness, the reinforcing treatment of round honing achieves uniform wear of each portion of the cutting edge and also has favorable effect on chip processing performance.

In FIG. 3, 7 indicates a heel, 8 indicates a margin, 9 indicates a flank face, and 10 indicates an oil supply that is provided as needed. Although the flank face 9 is achieved by combining a second flank face and a third flank face, the flank face 9 may be a single conical flank face.

EXAMPLES

Cemented carbide drills as the samples No. 1 to 12 illustrated in Table I were manufactured by way of trial with the specification that a body diameter D is φ3 mm, a flute length is 24 mm, a shank diameter D1 is cp3.0 mm, and a length is 65 mm. The curvature radius R2 of the flute surface of the flute along the flute portion cutting edge was 1.2 mm, and the curvature radius R1 of the heel-side flute surface of the flute was 0.35 mm.

The trial drills were manufactured by setting the core thickness, the flute width ratio θ1:θ2, the shape of the flute portion cutting edge (listed as the shape of cutting edge in Table I), the degree of concavity d of the flute portion cutting edge with respect to the above-described imaginary straight line, and the ratio (listed as the ratio of lengths in Table I) of the length B of the thinning portion cutting edge to the length A of the flute portion cutting edge as in Table I, and the performance of each sample was evaluated.

The evaluation test was conducted in the manner in which a hole was drilled in a workpiece of SUS416 under the following conditions.

Machining conditions: an outer circumferential cutting speed Vc=80 m/min, feed f=0.03 mm, machined hole depth H=20 mm, and internal oil supply wet machining applied The result of the test is summarized in Table II.

TABLE I

| | Design | | | | |
|---|---|---|---|---|---|
| Sample No. | Core thickness | Flute width ratio | Shape of cutting edge | Degree of concavity | Ratio of lengths B:A |
| 1 | 0.30 D | 0.80:1 | Slight arc | 0.015 D | 0.6:1 |
| 2 | 0.35 D | 0.80:1 | Slight arc | 0.015 D | 0.8:1 |
| 3 | 0.30 D | 0.80:1 | Straight line | 0 | 0.8:1 |
| 4 | 0.30 D | 0.80:1 | Slight arc | 0.005 D | 0.8:1 |

TABLE I-continued

| | Design | | | | |
|---|---|---|---|---|---|
| Sample No. | Core thickness | Flute width ratio | Shape of cutting edge | Degree of concavity | Ratio of lengths B:A |
| 5 | 0.30 D | 0.80:1 | Slight arc | 0.020 D | 0.8:1 |
| 6 | 0.30 D | 0.80:1 | Slight arc | 0.03 D | 0.8:1 |
| 7 | 0.30 D | 0.60:1 | Slight arc | 0.015 D | 0.8:1 |
| 8 | 0.30 D | 0.90:1 | Slight arc | 0.015 D | 0.8:1 |
| 9 | 0.30 D | 0.80:1 | Slight arc | 0.015 D | 0.5:1 |
| 10 | 0.30 D | 0.80:1 | Slight arc | 0.015 D | 0.6:1 |
| 11 | 0.30 D | 0.80:1 | Slight arc | 0.015 D | 0.9:1 |
| 12 | 0.30 D | 0.80:1 | Slight arc | 0.015 D | 1:1 |

TABLE II

| | Evaluation items | | | | | |
|---|---|---|---|---|---|---|
| Sample No. | Drill strength | Strength of outer circumferential cutting edge | Chip processing | Chip evacuation | Variation in hole diameter | Applicability determination |
| 1 | ○ | ○ | ○ | ○ | ○ | ○ |
| 2 | ○ | ○ | ○ | ○ | ○ | ○ |
| 3 | ○ | ○ | X | X | ○ | X |
| 4 | ○ | ○ | ○ | ○ | ○ | ○ |
| 5 | ○ | ○ | ○ | ○ | ○ | ○ |
| 6 | ○ | X | ○ | ○ | ○ | X |
| 7 | ○ | ○ | ○ | ○ | ○ | ○ |
| 8 | ○ | ○ | ○ | ○ | ○ | ○ |
| 9 | ○ | ○ | ○ | ○ | X | X |
| 10 | ○ | ○ | ○ | ○ | ○ | ○ |
| 11 | ○ | ○ | ○ | ○ | ○ | ○ |
| 12 | ○ | ○ | X | X | X | X |

Evaluation items: ○ satisfactory, X unsatisfactory
Applicability determination: ○ applicable, X non-applicable As seen from the test result of Table II, sample No. 3, sample No. 6, sample No. 9 and sample No. 12 have a problem in chip processing performance, evacuation performance, strength of cutting edge, and/or machining accuracy, the sample No. 3 having the flute portion cutting edge in a straight line, the sample No. 6 having a degree of concavity of the flute portion cutting edge with respect to the above-mentioned imaginary straight line, the degree exceeding 2% of the drill diameter, the sample No. 9 and sample No. 12 having a ratio 0,6 or less and 0.9 or greater of the length of the thinning portion cutting edge to the length of the flute portion cutting edge. Also, in sample No. 7, chip may be somewhat stuck, and although not non-applicable, a variation in hole diameter occurs a little.

On the other hand, favorable results were obtained in all evaluation items for the samples in which the degree of concavity and the ratio of the lengths of the cutting edges at the thinning portion and the flute portion satisfy the specified ranges of the present application.

Results with almost no difference from the evaluation results of Table II were obtained in machining under the conditions that the feed is 0.04 mm, 0.05 mm and the rest of the conditions are the same as those in the above-described examples.

The configuration of the embodiment of the present invention disclosed above has been described by way of example only, and the scope of the present invention is not limited to the scope of the description. The scope of the present invention is indicated by the description of the claims, and is further intended to include any modifications within the scope and meaning equivalent to the description of the claims,

REFERENCE SIGNS LIST 1 small-diameter drill
2 body
3 shank
4 cutting edge
4a flute portion cutting edge
4b thinning cutting edge
5 cross thinning portion
6 flute
7 heel
8 margin
9 flank face
10 oil supply
P radially outer end of flute portion cutting edge
Q radially outer end of thinning cutting edge
SL imaginary straight line connecting P and Q
d degree of concavity of flute portion
R1 curvature radius of heel-side flute surface of flute
R2 curvature radius of flute surface along flute portion cutting edge of flute

The invention claimed is:

1. A small-diameter drill having a diameter of φ3 mm or less and an end that has undergone cross thinning,
wherein in a front view, a flute portion cutting edge is curved in concave against a rotational direction with respect to an imaginary straight line that connects a radially outer end of the flute portion cutting edge and a radially outer end of a thinning portion cutting edge, a degree of concavity of the flute portion cutting edge with respect to the imaginary straight line is set in a range of 0.5 to 2% of a drill diameter, furthermore, a ratio B:A of a length B of the thinning portion cutting edge to a length A of the flute portion cutting edge is set to 0.6 to 0.9:1, and in an axially perpendicular cross-sectional view, a curvature radius R1 of a heel-side flute surface of a flute is set to be smaller than a curvature radius R2 of a flute surface along the flute portion cutting edge.

2. The small-diameter drill according to claim 1, wherein a radial rake angle γ of a radially outer end of the flute portion cutting edge is set to −5 to −15°.

3. The small-diameter drill according to claim 1, wherein a core thickness is set to 0.30D to 0.37D and a flute width ratio θ1: θ2 is set to 0.70 to 0.90:1.

4. The small-diameter drill according to claim 1, wherein the cutting edge has undergone reinforcing treatment of round honing with R radius of 0.005 to 0.015 mm.

\* \* \* \* \*